(12) United States Patent
Tokuchi

(10) Patent No.: US 11,361,645 B2
(45) Date of Patent: Jun. 14, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/037,553

(22) Filed: Sep. 29, 2020

(65) Prior Publication Data
US 2021/0012637 A1 Jan. 14, 2021

Related U.S. Application Data

(62) Division of application No. 16/116,935, filed on Aug. 30, 2018, now Pat. No. 10,832,547.

(30) Foreign Application Priority Data

Dec. 12, 2017 (JP) .............................. JP2017-237546

(51) Int. Cl.
| G08B 21/02 | (2006.01) |
| G08B 5/22 | (2006.01) |
| G06Q 50/00 | (2012.01) |
| G06F 3/01 | (2006.01) |

(52) U.S. Cl.
CPC .............. *G08B 21/02* (2013.01); *G06F 3/011* (2013.01); *G06Q 50/00* (2013.01); *G08B 5/22* (2013.01)

(58) Field of Classification Search
CPC .......... G08B 21/02; G08B 5/22; G06Q 50/00; G06F 3/011; E04H 1/125
See application file for complete search history.

(56) References Cited

U.S. PATENT DOCUMENTS

| 5,797,752 | A | 8/1998 | Umezawa |
| 9,642,219 | B2 * | 5/2017 | Mead ..................... H05B 47/16 |
| 9,955,318 | B1 * | 4/2018 | Scheper ................. H04W 4/38 |
| 10,055,887 | B1 * | 8/2018 | Gil ........................ G02B 27/017 |
| 2007/0241927 | A1 | 10/2007 | Ratnakar |
| 2018/0240274 | A1 * | 8/2018 | Cronin ................... G06F 3/011 |

FOREIGN PATENT DOCUMENTS

| JP | H08292776 | 11/1996 |
| JP | 3131580 | 2/2001 |
| JP | 2003056226 | 2/2003 |
| JP | 2015150064 | 8/2015 |

OTHER PUBLICATIONS

"Office Action of Japan Counterpart Application", dated Oct. 5, 2021, with English translation thereof, pp. 1-6.
"Office Action of Japan Counterpart Application" with English translation thereof, dated Apr. 12, 2022, p. 1-p. 4.

* cited by examiner

*Primary Examiner* — Brian Wilson
(74) *Attorney, Agent, or Firm* — JCIPRNET

(57) ABSTRACT

An information processing apparatus includes a processor is provided. The processor is configured to perform control so that a device that covers user's vision becomes available in a closed space that accommodates at least one user, in a condition that a door of the closed space is closed or locked.

9 Claims, 15 Drawing Sheets

FIG. 7

| BOOTH ID | USER ID | NUMBER OF USERS | RESERVED PERIOD |
|---|---|---|---|
| | | | |

FIG. 8

| BOOTH ID | USER ID | NUMBER OF USERS | RESERVED PERIOD | EXTENDABLE PERIOD |
|---|---|---|---|---|
| | | | | |

FIG. 17A1 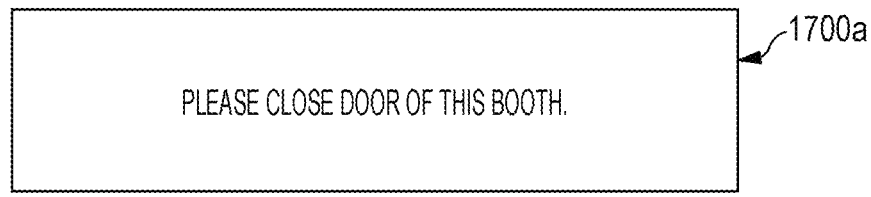
FIG. 17A2 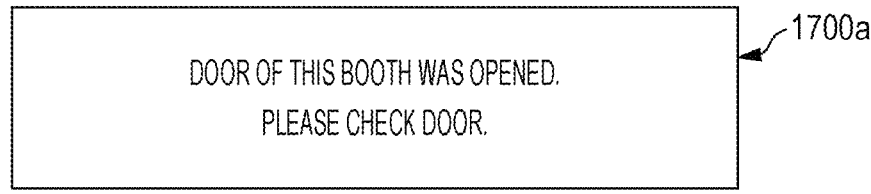

FIG. 17F1 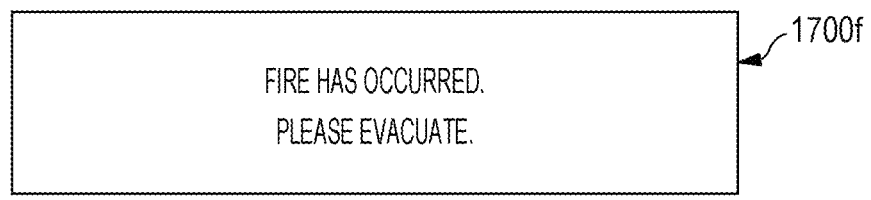
FIG. 17F2 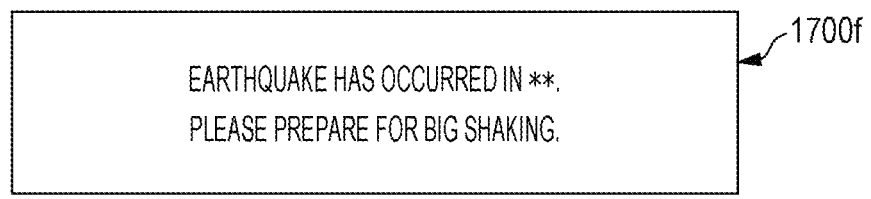

INFORMATION PROCESSING APPARATUS AND NON-TRANSITORY COMPUTER READABLE MEDIUM

CROSS-REFERENCE TO RELATED APPLICATIONS

This application is a divisional application of and claims the priority benefit of U.S. application Ser. No. 16/116,935, filed on Aug. 30, 2018, now allowed. The prior U.S. application Ser. No. 16/116,935 is based on and claims priority under 35 USC 119 from Japanese Patent Application No. 2017-237546 filed Dec. 12, 2017.

BACKGROUND

Technical Field

The present invention relates to an information processing apparatus and a non-transitory computer readable medium.

SUMMARY

According to an aspect of the invention, an information processing apparatus includes a processor is provided. The processor is configured to perform control so that a device that covers user's vision becomes available in a closed space that accommodates at least one user, in a condition that a door of the closed space is closed or locked.

BRIEF DESCRIPTION OF THE DRAWINGS

An exemplary embodiment of the present invention will be described in detail based on the following figures, wherein:

FIG. 7 is an explanatory view illustrating an example of a data structure of a booth schedule table;

FIG. 8 is an explanatory view illustrating an example of a data structure of a booth schedule table;

FIGS. 17A1, 17A2, 17B, 17C, 17D, 17E, 17F1, and 17F2 each illustrate a presentation example according to the present exemplary embodiment.

DETAILED DESCRIPTION

An exemplary embodiment of the present invention is described below with reference to the drawings.

Figure 1:
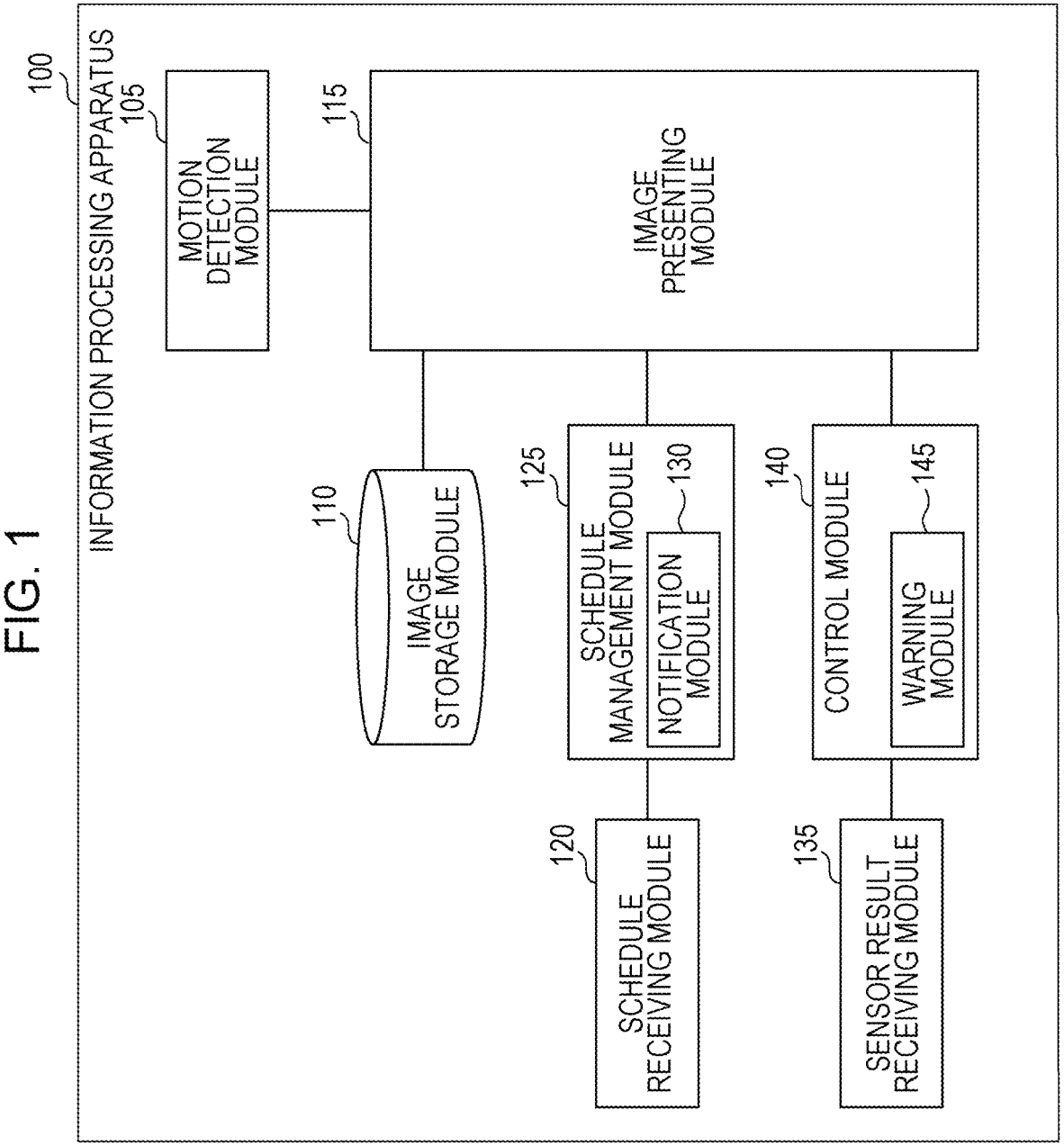
FIG. 1 is a conceptual module configuration diagram illustrating an example of a configuration according to the present exemplary embodiment.

FIG. 1 is a conceptual module configuration diagram illustrating an example of a configuration according to the present exemplary embodiment.

The "module" generally refers to logically independent software (a computer program) or a component such as hardware. Accordingly, a module according to the present exemplary embodiment refers to not only a module as a computer program, but also a module as a hardware configuration. Therefore, the present exemplary embodiment also serves as descriptions of a computer program for causing a computer to function as a module (a program for causing a computer to execute a procedure, a program for causing a computer to function as a unit, or a program for causing a computer to realize a function), a system, and a method. For convenience of description, "store", "stored", and equivalent terms are used, but these terms mean that a computer program is stored in a storage device or control is performed so that a computer program is stored in a storage device in a case where the exemplary embodiment is a computer program. Although a module may correspond to a function on a one-to-one basis, a single module may be constituted by a single program, plural modules may be constituted by a single program, or a single module may be constituted by plural programs. Furthermore, plural modules may be executed by a single computer or a single module may be executed by plural computers in a distributed or parallel environment. A single module may include another module. Hereinafter, "connection" refers to not only physical connection, but also logical connection (e.g., data exchange, an instruction, a reference relationship between data, login). The term "predetermined" refers to being determined before subject processing and encompasses not only being determined before start of processing according to the present exemplary embodiment, but also being determined before subject processing even after start of the processing according to the present exemplary embodiment in accordance with a situation or a state at the time or in accordance with a situation or a state so far. In a case where there are plural "predetermined values", the predetermined values may be different values or two or more of the predetermined values (including all of the predetermined values) may be identical to each other. The expression "in a case where A, B is performed" means that "whether A or not is determined, and in a case where it is determined that A, B is performed" except for a case where it is unnecessary to determine whether A or not. An expression listing plural things such as "A, B, C" is listing of examples unless otherwise specified and encompasses a case where only one of them (e.g., only A) is selected.

A system or an apparatus may be constituted not only by plural computers, hardware configurations, apparatuses, or the like that are connected through means of communication such as a network (including one-to-one communication connection), but also by a single computer, hardware configuration, apparatus, or the like. The terms "system" and "apparatus" are uses synonymously. Needless to say, the term "system" does not encompass a social "mechanism" (social system) that is an artificial arrangement.

For each of processes performed by modules or for each of processes performed by a module in a case where plural processes are performed within the module, target information is read from a storage device, and a result of the process is written into the storage device after the process. Description of reading of the information from the storage device before the process and writing into the storage device after the process is sometimes omitted. Examples of the storage device may include a hard disk, a random access memory (RAM), an external storage medium, a storage device connected through a communication line, and a register in a central processing unit (CPU).

An information processing apparatus 100 according to the present exemplary embodiment is an apparatus that is capable of outputting an image in a case where a device that covers user's vision and changes a presented image in accordance with a direction of an action of the user receives an output instruction. As illustrated in FIG. 1, the information processing apparatus 100 includes a motion detection module 105, an image storage module 110, an image presenting module 115, a schedule receiving module 120, a schedule management module 125, a sensor result receiving module 135, and a control module 140.

The "device that covers user's vision and changes a presented image in accordance with a direction of an action of the user" is, for example, a head-mounted display. The head-mounted display is a display that is attached to a head like goggles, a helmet, or glasses and is also called "smart-glasses". The expression "covers user's vision" encompasses not only a case where user's vision is completely blocked so that the user can see only an image presented by the image presenting module 115, but also a case where the user mostly sees an image presented by the image presenting module 115 but can see an outside world, for example, from corners of the eyes in a case of a display attached to a head. That is, this device need just be arranged such that the user is focused on an image presented by the image presenting module 115. In other words, it is only necessary that the user cannot receive information about a physical outside world.

A technique for artificially creating an environment that offers a sense of reality by working on human' sense organs is called "VR" (virtual reality). A system in which video (image) generated in real time by a computer is displayed on a head-mounted display realizes VR. For example, a remote conference may be realized by VR.

The expression "in accordance with a direction of an action of the user" means that a motion of a user's body such as a head or a user's gaze is detected, and a result of the detection is reflected on display contents.

The information processing apparatus 100 is used in a closed space that accommodates at least one user. The "closed space (hereinafter also referred to as a booth)" refers to a space which a person other than a user who is scheduled to use the space cannot easily enter and is a space that is not opened and is closed or a space that is isolated. For example, the closed space may be a space isolated from an outside world by being surrounded by partitions such as walls around a user or may be a box-shaped space like a phone booth. Note, however, that a ceiling may be opened. Furthermore, the space may be provided with a window or the like. That is, the booth need not be a space that is completely sealed, provided that the booth is a space that is designed (for example, equipped with a doorway that can be opened and closed and can be locked) to separate a booth inner space from an outside of the inner space partitioned by the booth so that a third party other than a user present in the inner space and other person(s) permitted to be present in the booth inner space at the same time cannot enter the booth inner space. The "third party" refers to a person other than the user and a person permitted to be present in the booth (a person who is not the user nor the person permitted to be present in the booth). A specific example will be described later with reference to FIG. 3.

The closed space is equipped with a door that allows the user to enter and leave the closed space, and the door is desirably lockable. A transparent plate such as glass (or a semi-transparent plate such as frosted glass) may be embedded in a wall and a door that constitute the closed space. The kind of door is not limited in particular and can be, for example, a hinged door, a sliding door, an overhung door, or a folding door. Alternatively, the door may be an automatic door. That is, opening and closing of the door may be controlled by moving a position of the door by using a driving unit such as a motor.

The closed space may be used by a user who has made a reservation or may be used anytime when the closed space is opened.

The motion detection module 105 is connected to the image presenting module 115. The motion detection module 105 detects a user's motion. As described above, the motion detection module 105 detects a motion of a user's body such as a head or a user's gaze.

The image storage module 110 is connected to the image presenting module 115. The image storage module 110 stores therein an image that can be presented to a user's field of view. The image storage module 110 stores therein data such as a moving image, a still image, a three-dimensional image, and audio data. Specifically, the image storage module 110 stores therein a 360-degree surrounding image at each time. The surrounding image need not necessarily cover 360 degrees. That is, even in a case where the surrounding image covers only a specific angle, the "device that changes a presented image in accordance with a direction of an action of the user" according to the present invention is met. In a case where the surrounding image is not switched (displayed) beyond the specific angle, display may be controlled so that there is no image or the image is not switched beyond the specific angle.

The image presenting module 115 is connected to the motion detection module 105, the image storage module 110, the schedule management module 125, and the control module 140. The image presenting module 115 changes an image presented to a user's field of view in accordance with a user's action detected by the motion detection module 105.

In VR, an image that covers 360 degrees is displayed for each scene of application software. That is, after X minutes from activation of the application software, a 360-degree image is prepared for a scene after X minutes, and after Y minutes from activation of the application software, a 360-degree image is prepared for a scene after Y minutes. Since a human's field of view is basically approximately 180 degrees, a region that covers this field of view is cut out corresponding to a display of a virtual reality display device 200 and the region is displayed.

The image presenting module 115 may excite human's five senses, for example, may output sound or the like or may vibrate in addition to presentation of an image.

The schedule receiving module 120 is connected to the schedule management module 125. The schedule receiving module 120 receives schedule information concerning a closed space in which the information processing apparatus 100 is used, for example, from a server for schedule management through a communication line. The schedule information may be stored in the information processing apparatus 100.

The schedule management module 125 includes a notification module 130 and is connected to the image presenting module 115 and the schedule receiving module 120. The schedule management module 125 manages schedule of the closed space in which the information processing apparatus 100 is used by using the schedule information received by the schedule receiving module 120. For example, the schedule management module 125 manages from what time to what time the closed space is used by whom and whether or not the closed space is available. Specifically, the schedule management module 125 may manage schedule by using a booth schedule table 700 that will be described later with reference to the example of FIG. 7. The schedule information may include a period for which the closed space is available, a period for which use of the closed space is permitted, and a reserved end time.

For example, the schedule management module 125 may cancel a reservation of a closed space upon detection of unlocking of the closed space. For example, the schedule management module 125 may give an instruction to cancel a reservation, for example, to the server that manages schedule of the closed space through the schedule receiving module 120. Whether or not the closed spaced has been "unlocked" may be detected by the sensor result receiving module 135, and a result of the detection may be received by the schedule management module 125. "Unlocking" of the closed space means that use of the closed space has ended, and therefore a reservation of the closed space is cancelled. In a case where the closed space is unlocked before a reserved end time, a fee for usage of the closed space may be paid back in accordance with a remaining period to the end time.

Furthermore, a reservation of a closed space may be cancelled on a condition that unlocking of the closed space is detected after the end of use of the information processing apparatus 100. This is to cope with a case where the closed space is mistakenly unlocked even during use of the information processing apparatus 100.

The notification module 130 gives a notification to a user in a case where a device (the information processing apparatus 100) that covers user's vision is used in a closed space that accommodates at least one user and a managed time based on a period for which the closed space is available (examples of which include a reserved period; a reserved period is used as an example in the following description) is reached.

The notification module 130 may give a notification by using the information processing apparatus 100. For example, the notification module 130 presents the notification to a user's field of view by using the information processing apparatus 100. Specifically, the notification module 130 gives the notification by using the image presenting module 115. For example, a message such as "MANAGED TIME HAS BEEN REACHED" may be displayed on a display of the virtual reality display device 200. Alternatively, for example, the notification module 130 may give an audio notification by using a speaker (examples of which include headphones and earphones) or may give a notification using vibration.

The managed time may be a period for which a closed space is available, a period for which use of a closed space is permitted, a reserved end time, and/or a time that is earlier by a predetermined period than the reserved end time. That is, a user is notified in a case where the reserved end time of the closed space has approached, a case where a current time has reached the reserved end time, or a case where a current time has passed the reserved end time. This allows the user to know that the reserved end time of the closed space is approaching even in a case where the device that covers user's vision is being used (for example, even in a case where the user is engaged in content provided by the information processing apparatus 100), thereby allowing the user to prepare for the end. In some cases, a user suddenly visits a closed space and starts using the closed space (in a period for which the closed space is available or a period for which use of the closed space is permitted) without reservation. Specifically, such an arrangement is also possible in which a user can use a closed space for a predetermined period (e.g., a reset period for which the closed space can be used by payment of 100 yen) after a previous user leaves the closed space, as in a case where a user plays a game at a game arcade or the like.

The schedule management module 125 may delete an image displayed for a user of the device that covers user's vision in a case where the managed time is reached. That is, use of the information processing apparatus 100 may be forcibly finished.

The sensor result receiving module 135 is connected to the control module 140. The sensor result receiving module 135 supplies, to the control module 140, a result of detection obtained by a sensor provided inside or outside a closed space (e.g., a sensor that detects locking and unlocking, a human detection sensor, and a camera). For example, in a case where a human detection sensor provided inside or outside a closed space detects an action of a person other than a user, the sensor result receiving module 135 receives a result of the detection and supplies the result of the detection to the control module 140. A face recognition technique may be used to determine whether or not a person is a "person other than a user". A face of a user (a legitimate user) who has reserved a closed space may be registered in advance, and a person other than this user may be decided as a "person other than the user".

As for the expression "provided inside or outside a closed space", a place where a sensor is provided may be a door, a wall, a floor, a ceiling, or the like that constitutes a closed space or may be a place (e.g., a pillar close to the closed space) that does not constitute the closed space.

The sensor may be a sensor that detects a state concerning a door of the closed space. The sensor may be configured to detect at least one of an opened state of the door of the closed space, an unlocked state of the door, and touch on an outer side of the door of the closed space.

The sensor may be a sensor that detects the presence of a larger number of persons than a predetermined number in the closed space. In this case, the sensor is a human detection sensor that is provided inside the closed space and detects the number of persons present in the closed space. Whether or not the number of persons present in the closed space is a predetermined number need just be determined by receiving schedule information (the number of persons who have made a reservation in a current time zone) from the schedule management module 125.

The sensor may be a sensor that detects the presence of a person outside the closed space. For example, the sensor may detect that a person is present outside the closed space on a condition that the person is present within a predetermined distance from the closed space for a predetermined period or longer. That is, this person is a person walking (wandering) around the closed space.

The sensor result receiving module 135 may receive disaster information concerning a place where a closed space is provided. For example, the sensor result receiving module 135 may communicate with a server that offers earthquake early warning service, a server that offers fire information of a facility where the closed space is provided, or the like and thus receive these pieces of information.

The control module 140 has a warning module 145 and is connected to the image presenting module 115 and the sensor result receiving module 135. The control module 140 performs control so that the device (the information processing apparatus 100) that covers user's vision can be used in a closed space that accommodates at least one user on a condition that a door of the closed space is closed or locked. That is, since using the information processing apparatus 100 in a state where the closed space is not locked is dangerous (for example, another person enters the closed space and steals belongings of the user), the control module 140 performs control so that such a situation can be avoided.

The warning module 145 gives a warning to a user upon detection of a possibility of occurrence of harm on the user in a case where the device (the information processing apparatus 100) that covers user's vision is being used in a closed space that accommodates at least one user. This allows the user to know the possibility of occurrence of harm in a real world.

The "possibility of occurrence of harm on the user" is, for example, occurrence of a disaster (or prediction of occurrence of a disaster) or a possibility of occurrence of harm caused by a person other than the user. Examples of the disaster includes weather disasters (e.g., rain and wind), natural disasters such as an earthquake, and human-made disasters such as a fire.

The warning module 145 may issue a warning by using the information processing apparatus 100. For example, the warning module 145 gives a notification to a user's field of view by using the information processing apparatus 100. Specifically, the warning module 145 gives a notification by using the image presenting module 115. For example, a message such as "SOMEONE IS TRYING TO OPEN DOOR" or "FIRE HAS OCCURRED" may be displayed on the display of the virtual reality display device 200. Alternatively, for example, the warning module 145 may give an audio notification by using a speaker or may give a notification by using vibration.

The warning module 145 may issue a warning in a case where "an action of a person other than a user inside or outside a closed space" is detected by the sensor result receiving module 135.

The warning module 145 may issue a warning in a case where disaster information is received by the sensor result receiving module 135.

Figure 2:
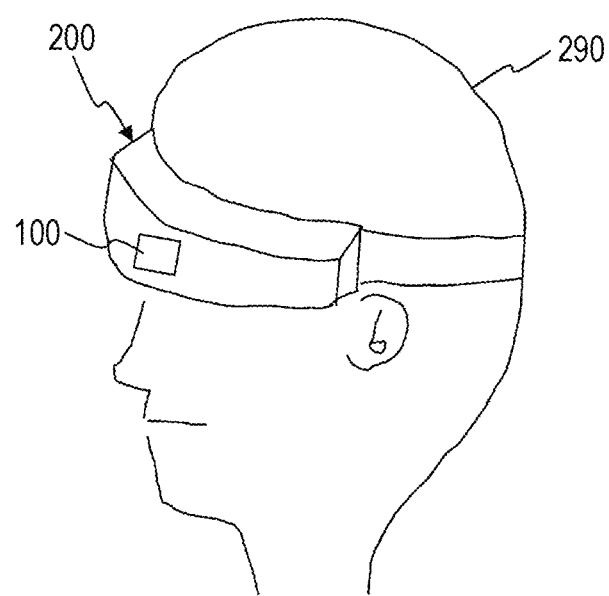
FIG. 2 is an explanatory view illustrating an example of a virtual reality display device including the present exemplary embodiment.

FIG. 2 is an explanatory view illustrating an example of the virtual reality display device 200 including the present exemplary embodiment (the information processing apparatus 100).

The virtual reality display device 200 is called a head-mounted display and includes the information processing apparatus 100. The virtual reality display device 200 has, for example, a goggle-shape. Alternatively, the virtual reality display device 200 may have an eyeglass-shape. The image presenting module 115 of the information processing apparatus 100 includes a presenting unit (e.g., a display or a screen) that is configured to cover a vision (a field of view, an eyesight) of a user 290 wearing the virtual reality display device 200. That is, when the user attaches the virtual reality display device 200 onto his or her head, the presenting unit of the image presenting module 115 is located in front of left and right eyes of the user 290. This allows the user 290 to see only an image presented to the field of view by the image presenting module 115, thereby allowing the user 290 to be engaged in a virtual space. The image presenting module 115 may be constituted by a presenting unit for left eye that presents an image to the left eye of the user 290 and a presenting unit for right eye that presents an image to the right eye of the user 290.

The motion detection module 105 of the information processing apparatus 100 includes at least one of a geomagnetic sensor, an acceleration sensor, a tilt sensor (e.g., an angular velocity sensor, a gyro sensor), and a gaze sensor and is capable of detecting various kinds of motions of the virtual reality display device 200 attached onto the head of the user 290 (i.e., various kinds of motions of the head of the user 290) or a gaze.

The virtual reality display device 200 may be equipped with a controller operated by the user 290, a microphone that receives voice of the user 290, a speaker (examples of which include headphones and earphones) that output sound, a motion sensor that detects a motion of a body (examples of which include a hand, a finger, and a leg), and the like.

For example, a reference position of the user 290 is determined after activation of the virtual reality display device 200. By estimating a displacement (a change of an angle such as a gyro angle) from the reference position, which region of a 360-degree image at a current scene is displayed is determined.

A preview screen for preview of an image to be output may be displayed upon issuance of an output instruction, various setting screens for settings of a size and the like may be displayed as in a case of a printing instruction from a personal computer, and the image may be output after an instruction is received on the setting screens.

VR content may be, for example, a game, a trip, real-estate preview, a lessen at a school, or a remote conference.

In a case where a user enjoys a VR image by using a device, such as the virtual reality display device 200, that covers vision, information on an outside real space is restricted.

This undesirably allows a malicious person to easily harm the user 290 and steal something in a public space (a space that is not a closed space where only the user 290 is present). That is, the user 290 is vulnerable, and it is hard for the user 290 to notice a change of surroundings. There is a possibility of occurrence of a crime committed against a vulnerable user engaged in a VR image (content such as a game). For example, there is a possibility of stealing of valuables such as a wallet from a bag, secret photographing, body groping, and the like.

Figure 3:
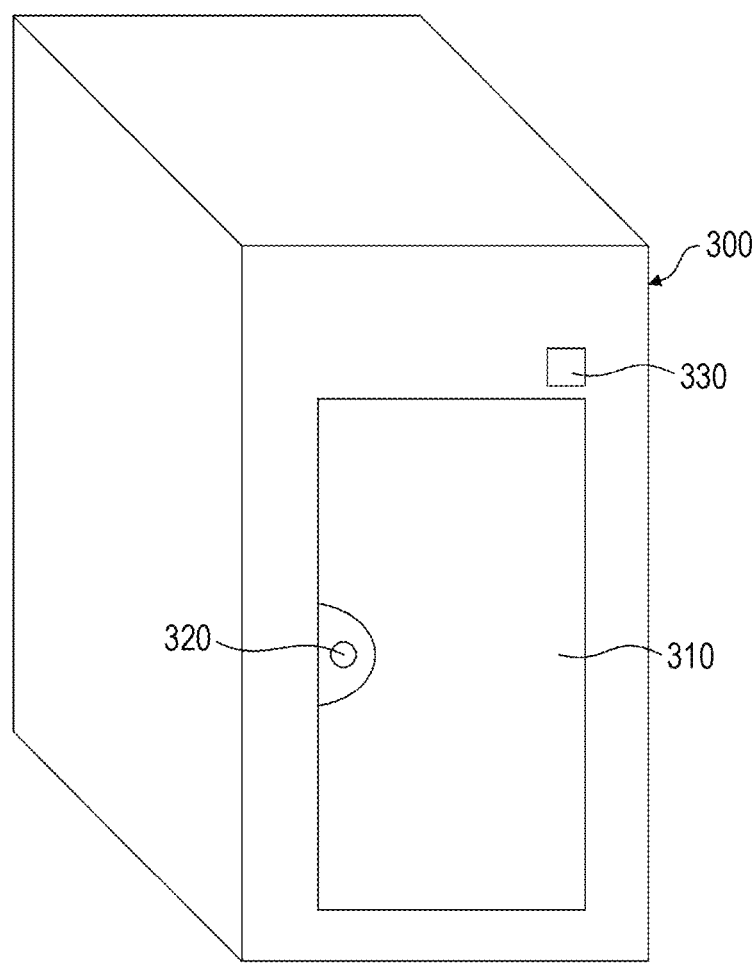
FIG. 3 is an explanatory view illustrating an example of a booth in which the present exemplary embodiment can be used.

In view of this, it is assumed that the virtual reality display device 200 is used in a booth 300 illustrated in FIG. 3.

FIG. 3 is an explanatory view illustrating an example of the booth 300 (an example of a closed space) where the present exemplary embodiment can be used.

The booth 300 has a door 310 and a human detection sensor 330. The door 310 has a door knob 320 and is equipped with a sensor that detects opening and closing of the door 310, whether or not the door 310 is locked (or whether or not the door 310 is opened), and whether or not the door knob 320 is being touched (especially whether or not the door knob 320 is being touched from an outside). The human detection sensor 330 is a motion detector and is, for example, an infrared sensor, a surveillance camera, or a pyroelectric infrared sensor.

The booth 300 aims, for example, for activation of telework and mobile work and provides a work environment and a private room of high security in order to cope with a wide variety of work styles. Furthermore, the booth 300 also functions as a communication booth.

For example, the booth 300 not only can be placed in a train station, an airport lounge, an office, a shop such as a restaurant or a department store, and a bank, but also can be placed outdoor, for example, at a park and on a road. The booth 300 is desirably soundproof.

Inside the booth 300, a desk (or a table or the like) and a chair, a personal computer that enables a web conference, the virtual reality display device 200, and the like are placed. This allows a user to work in a quiet environment of high security by using a telephone, a web conference, a personal computer, and the virtual reality display device 200. In addition, a printer, scanner, and the like may be placed inside the booth 300. The virtual reality display device 200 used by the user 290 may be one installed in the booth 300 (i.e., equipment (shared device) of the booth 300) or may be one brought into the booth 300 by the user 290 (i.e., a possession of the user 290). The user 290 may be anyone. For example, the user 290 is a business person on a business trip or a person who wants to enjoy content provided by the virtual reality display device 200.

Since the booth 300 offers such an environment, the user 290 can use the virtual reality display device 200 without concern of other persons.

However, the booth 300 is not always safe and secure. For example, the following cases can be assumed: (1) a case where the user 290 continues to use the virtual reality display device 200 without noticing that a reserved period has ended although the booth 300 is unlocked at the same time as the end of the reserved period, (2) a case where the user 290 uses the virtual reality display device 200, for example, before locking the booth 300, (3) a case where a person (a suspicious person) other than the user 290 is wandering around the booth 300, and (4) a case where a disaster has occurred.

In view of this, according to the present exemplary embodiment, occurrence of such cases is prevented (or even in a case where such cases occur, the occurrence can be promptly grasped by the user 290). The present exemplary embodiment finally aims for an environment comfortable for the user 290 enjoying a VR image by using the booth 300 (note that this sentence should not be interpreted that a comfortable environment is always realized by the present exemplary embodiment).

Figure 4:
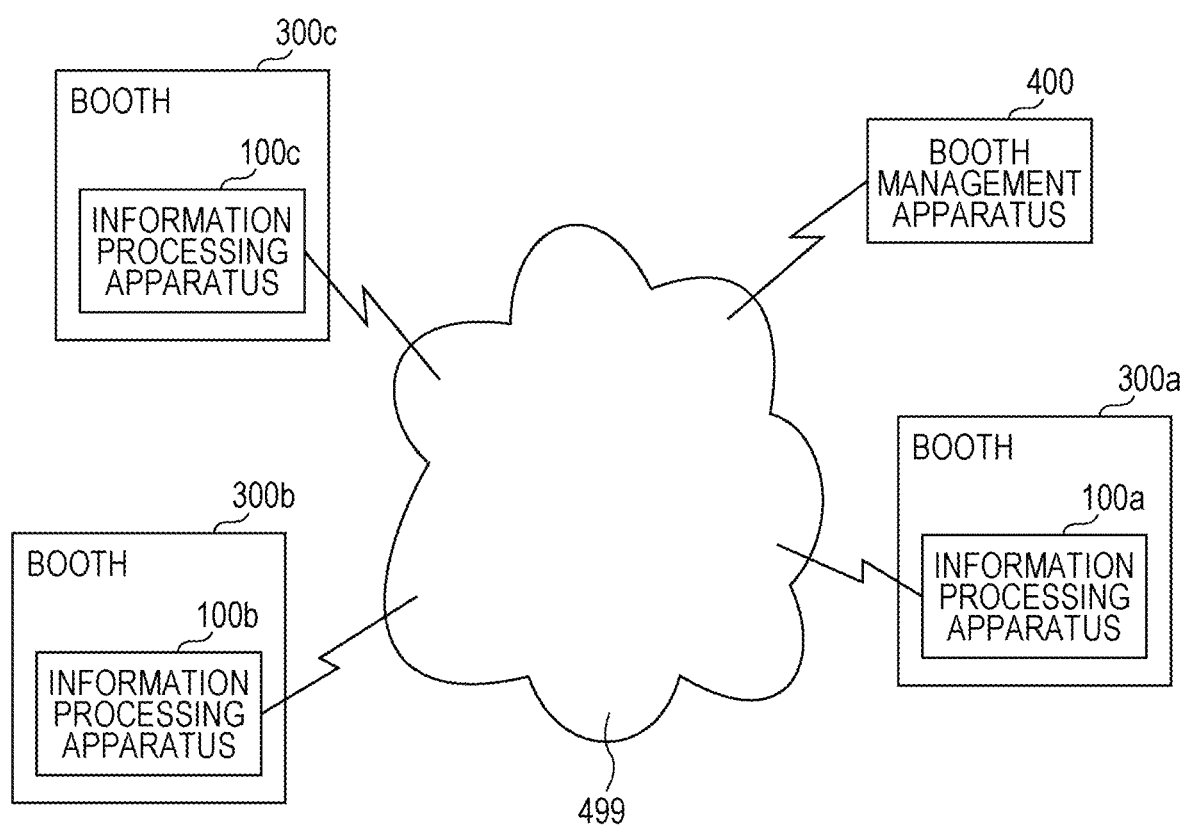
FIG. 4 is an explanatory view illustrating an example of a system configuration using the present exemplary embodiment.

FIG. 4 is an explanatory view illustrating an example of a configuration of a system using the present exemplary embodiment.

The information processing apparatus 100 is installed inside the booth 300 or is brought into the booth 300 by the user 290. An information processing apparatus 100a in a booth 300a, an information processing apparatus 100b in a booth 300b, an information processing apparatus 100c in a booth 300c, and a booth management apparatus 400 are connected to one another over a communication line 499. The communication line 499 may be a wireless line, a wired line, or a combination thereof and may be, for example, a communication infrastructure such as the Internet or an intranet. Functions of the booth management apparatus 400 may be realized as cloud service.

The booth management apparatus 400 registers therein available booths 300 and manages reservation conditions and the like. The booth management apparatus 400 performs reservation management by allocating a user (the user 290) to an available booth 300. Especially in a case of business use, the booth management apparatus 400, for example, registers and modifies terms of contracts with companies and registers and manages users for each company. Furthermore, the booth management apparatus 400 registers and manages individual users. These operations may be performed immediately before use of the booth 300. Furthermore, the booth management apparatus 400 manages logs such as user information, reservation information, and entry and exit information. The booth management apparatus 400 may create a bill on the basis of these pieces of information and may create and send a bill using a format designated for each company.

Figure 5:
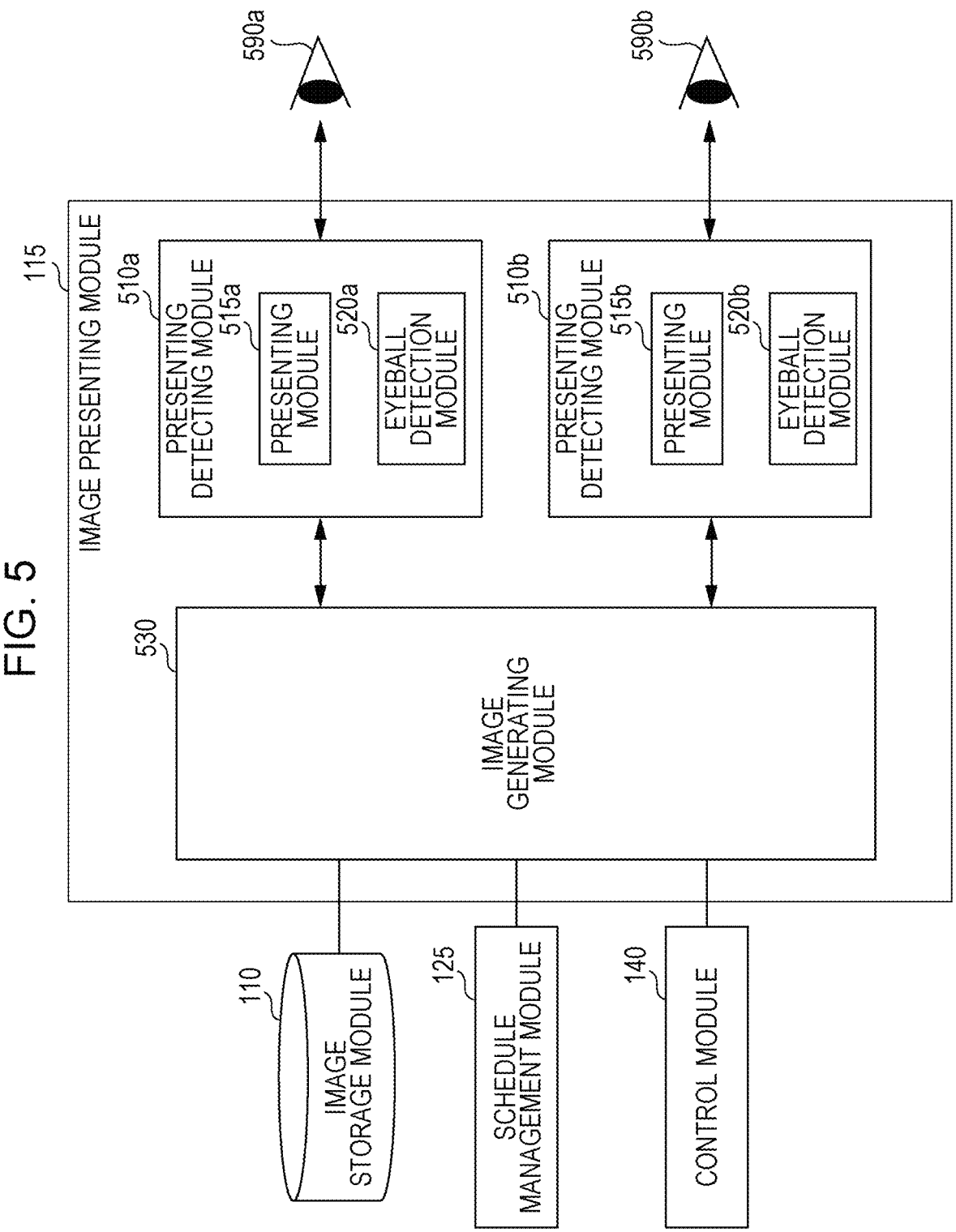
FIG. 5 is a conceptual module configuration diagram illustrating an example of a configuration of an image presenting module.

FIG. 5 is a conceptual module configuration diagram illustrating an example of a configuration of the image presenting module 115.

The image presenting module 115 includes a presenting detecting module 510a, a presenting detecting module 510b, and an image generating module 530. The presenting detecting module 510a and the presenting detecting module 510b, a presenting module 515a and a presenting module 515b, and an eyeball detection module 520a and an eyeball detection module 520b, which are for a left eye and a right eye, respectively, have a similar configuration and are therefore given reference signs 510, 515, and 520, respectively.

The image storage module 110 is connected to the image generating module 530 of the image presenting module 115. The image generating module 530 is connected to the image storage module 110, the schedule management module 125, the control module 140, and the presenting detecting modules 510. The presenting detecting modules 510 includes the presenting modules 515 and the eyeball detection modules 520 and are connected to the image generating module 530.

The image generating module 530 generates image signals to be supplied to the left and right presenting modules 515 (the presenting module 515a and the presenting module 515b) on the basis of image data acquired from the image storage module 110. Next, the presenting modules 515 emit image light based on the image signals to display surfaces, and thus images are presented to eyes 590 of the user 290.

The eyeball detection modules 520 detect gazes of the eyes 590 of the user 290. The eyeball detection modules 520 bear part of processing performed by the motion detection module 105.

The schedule management module 125 is connected to the image generating module 530 of the image presenting module 115. The schedule management module 125 presents, for example, information indicating that a managed time is reached on the basis of a reserved period of the booth 300 by using the image presenting module 115.

The control module 140 is connected to the image generating module 530 of the image presenting module 115. The control module 140 presents, for example, information indicating that "someone is trying to open the door 310" or "a fire has occurred" by using the image presenting module 115.

Figure 6:
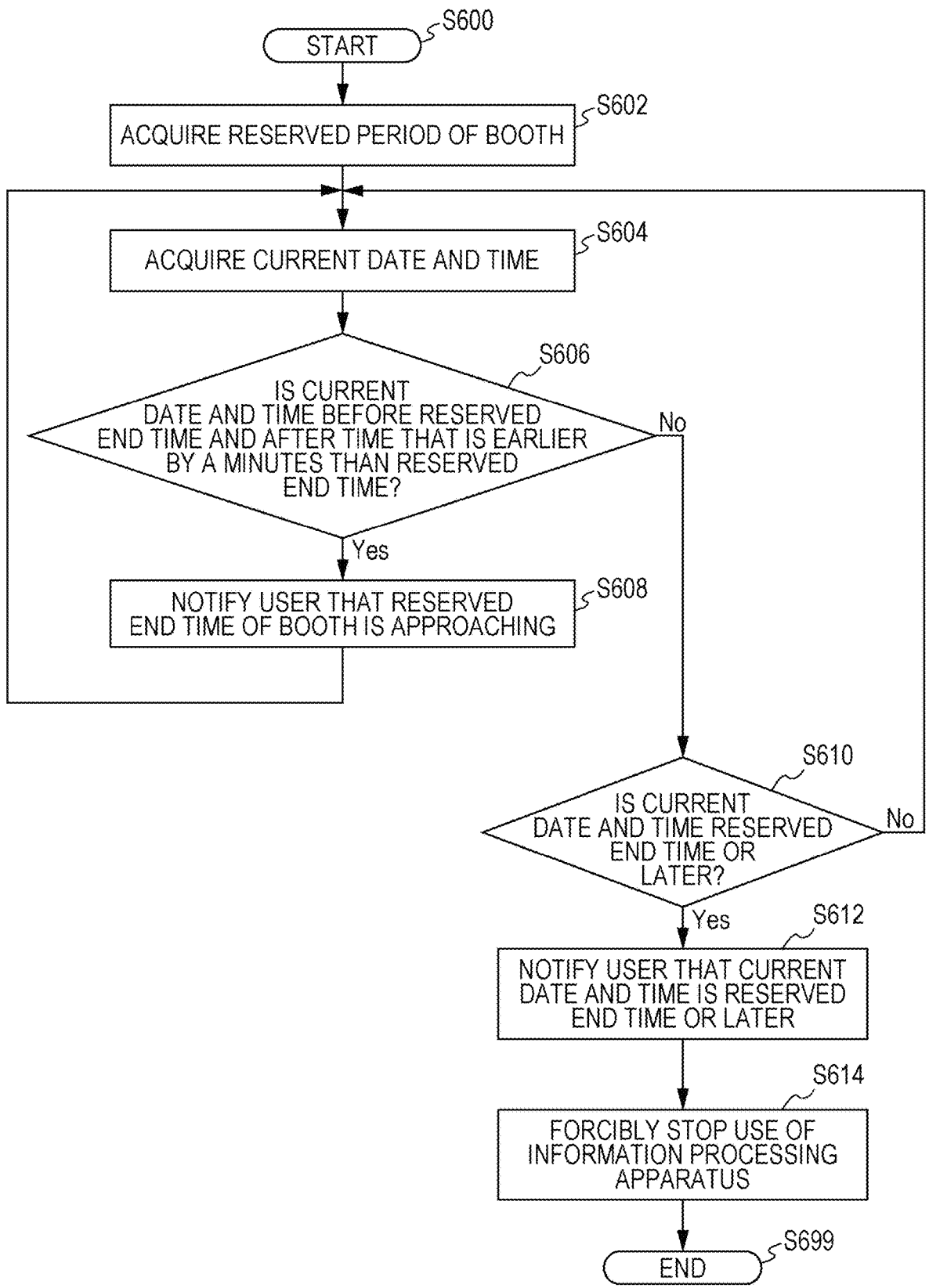
FIG. 6 is a flowchart illustrating an example of processing according to the present exemplary embodiment.

FIG. 6 is a flowchart illustrating an example of processing according to the present exemplary embodiment.

In Step S602, the schedule management module 125 acquires a reserved period of the booth 300 from the booth management apparatus 400 through the schedule receiving module 120. For example, the schedule management module 125 acquires the booth schedule table 700. FIG. 7 is an explanatory view illustrating an example of a data structure of the booth schedule table 700. The booth schedule table 700 has a booth ID column 705, a user ID column 710, a user number column 715, and a reserved period column 720. In the booth ID column 705, information (booth ID: IDentification) for uniquely identifying the booth 300 is stored in the present exemplary embodiment. In the user ID column 710, information (user ID) for uniquely identifying the user 290 using the booth 300 is stored in the present exemplary embodiment. In the user number column 715, the number of persons using the booth 300 is stored. In the reserved period column 720, a reserved period (e.g., a reserved start time (a year, a month, a date, an hour, a minute, a second, a smaller time unit, or a combination thereof) and a reserved end time) of the booth 300 is stored.

In Step S604, the schedule management module 125 acquires current date and time.

In Step S606, the schedule management module 125 determines whether or not the current date and time is before the reserved end time and after a time that is earlier by A minutes (a predetermined period, for example, 5 minutes) than the reserved end time. Step S608 is performed in a case where the current date and time is before the reserved end time and after the time that is earlier by A minutes than the reserved end time. Step S610 is performed in other cases.

Figure 9A:
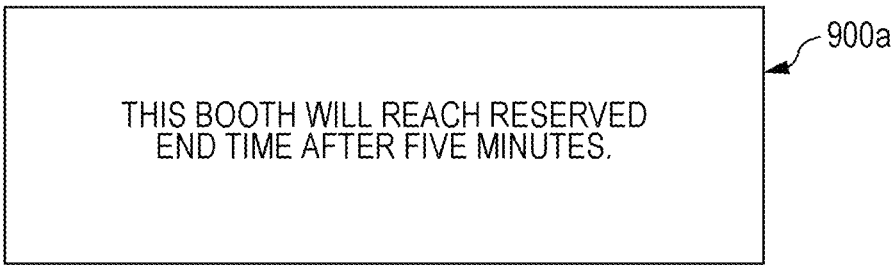
FIGS. 9A and 9B each illustrate a presentation example according to the present exemplary embodiment.

In Step S608, the notification module 130 notifies the user 290 that the reserved end time of the booth 300 is approaching, and Step S604 is performed again. For example, a screen 900a illustrated in FIG. 9A is presented on the display of the virtual reality display device 200. For example, a message "THIS BOOTH WILL REACH RESERVED END TIME AFTER FIVE MINUTES." is presented on the screen 900a.

In Step S610, the schedule management module 125 determines whether or not the current date and time is the reserved end time or later. In a case where the current date and time is the reserved end time or later, Step S612 is performed. Step S604 is performed again in other cases.

Figure 9B:
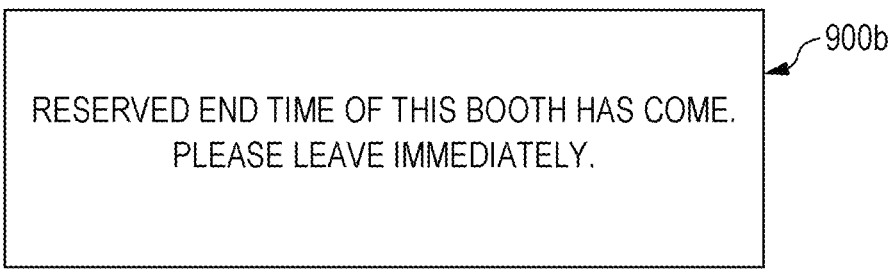

In Step S612, the notification module 130 c. For example, a screen 900b illustrated in FIG. 9B is presented on the display of the virtual reality display device 200. For example, a message "RESERVED END TIME OF THIS BOOTH HAS COME. PLEASE LEAVE IMMEDIATELY." is presented on the screen 900b.

In Step S614, the control module 140 forcibly stops use of the information processing apparatus 100 (the virtual reality display device 200).

A booth schedule table 800 may be used instead of the booth schedule table 700. FIG. 8 is an explanatory view illustrating an example of a data structure of the booth schedule table 800. The booth schedule table 800 has a booth ID column 805, a user ID column 810, a user number column 815, a reserved period column 820, and an extendable period column 825. The booth schedule table 800 is one obtained by adding the extendable period column 825 to the booth schedule table 700. The booth ID column 805, the user ID column 810, the user number column 815, and the reserved period column 820 are similar to the booth ID column 705, the user ID column 710, the user number column 715, and the reserved period column 720, respectively. In the extendable period column 825, a period extendable after the reserved end time in the booth 300 is stored. That is, the extendable period column 825 indicates a state where there is no reservation after the subject reservation.

In a case where the booth schedule table 800 is used, the extendable period column 825 of the booth schedule table 800 may be checked after Step S608 or Step S612. In a case where use of the booth 300 is extendable, information indicating that use of the booth 300 is extendable may be presented, and the user may be allowed to file a request for extension of use of the booth 300. Specifically, in a case where the extendable period column 825 stores a positive period therein (in a case where there is a period to a next reservation in the booth 300), information indicating that use of the booth 300 is extendable for this period may be presented, and the user may be allowed to file a request for extension. Extension may be allowed on a condition of payment of an extension fee. In a case where "0" is stored in the extendable period column 825, information indicating that the booth 300 has been already reserved by a next person may be presented, and information indicating that a request for extension cannot be filed may be presented.

Figure 10A:
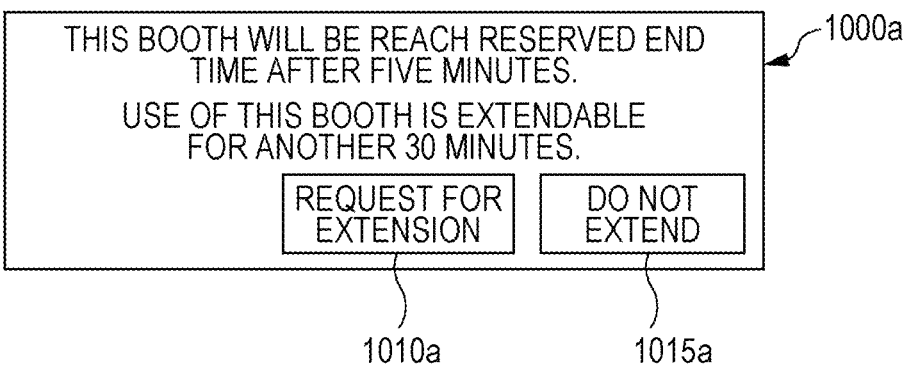
FIGS. 10A and 10B each illustrate a presentation example according to the present exemplary embodiment.

In a case where use of the booth 300 is extendable after Step S608, a screen 1000a illustrated in FIG. 10A for example is presented on the display of the virtual reality display device 200. For example, a message "THIS BOOTH WILL BE REACH RESERVED END TIME AFTER FIVE MINUTES. USE OF THIS BOOTH IS EXTENDABLE FOR ANOTHER 30 MINUTES." is presented, and a "REQUEST FOR EXTENSION" button 1010a and a "DO NOT EXTEND" button 1015a are presented. In a case where the "REQUEST FOR EXTENSION" button 1010a is selected, a screen for a request for extension is presented through communication with the booth management apparatus 400 so as to arrange for the user to request extension. In a case where the "DO NOT EXTEND" button 1015a is selected, the screen 900a may be presented again.

Figure 10B:
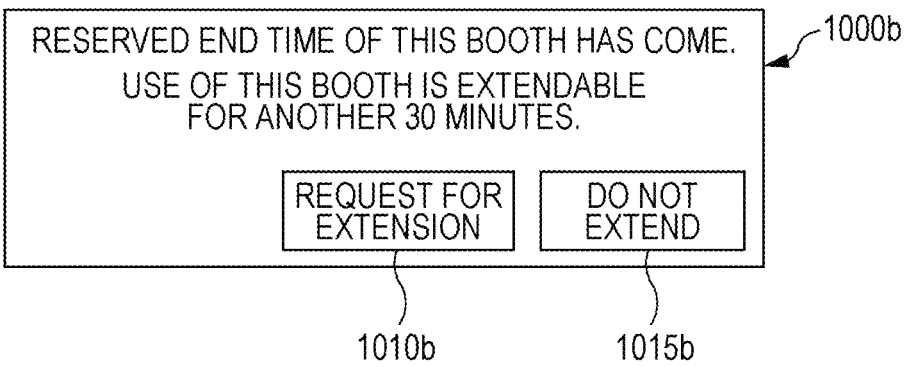

In a case where use of the booth 300 is extendable after Step S612, for example, a screen 1000b illustrated in FIG. 10B is presented on the display of the virtual reality display device 200. For example, a message "RESERVED END TIME OF THIS BOOTH HAS COME. USE OF THIS BOOTH IS EXTENDABLE FOR ANOTHER 30 MINUTES." is presented, and a "REQUEST FOR EXTENSION" button 1010b and a "DO NOT EXTEND" button 1015b are presented on the screen 1000b. In a case where the "REQUEST FOR EXTENSION" button 1010b is selected, processing similar to the processing performed in a case where the "REQUEST FOR EXTENSION" button 1010a is selected is performed. In a case where the "DO NOT EXTEND" button 1015b is selected, the screen 900b may be presented again.

Figure 11:
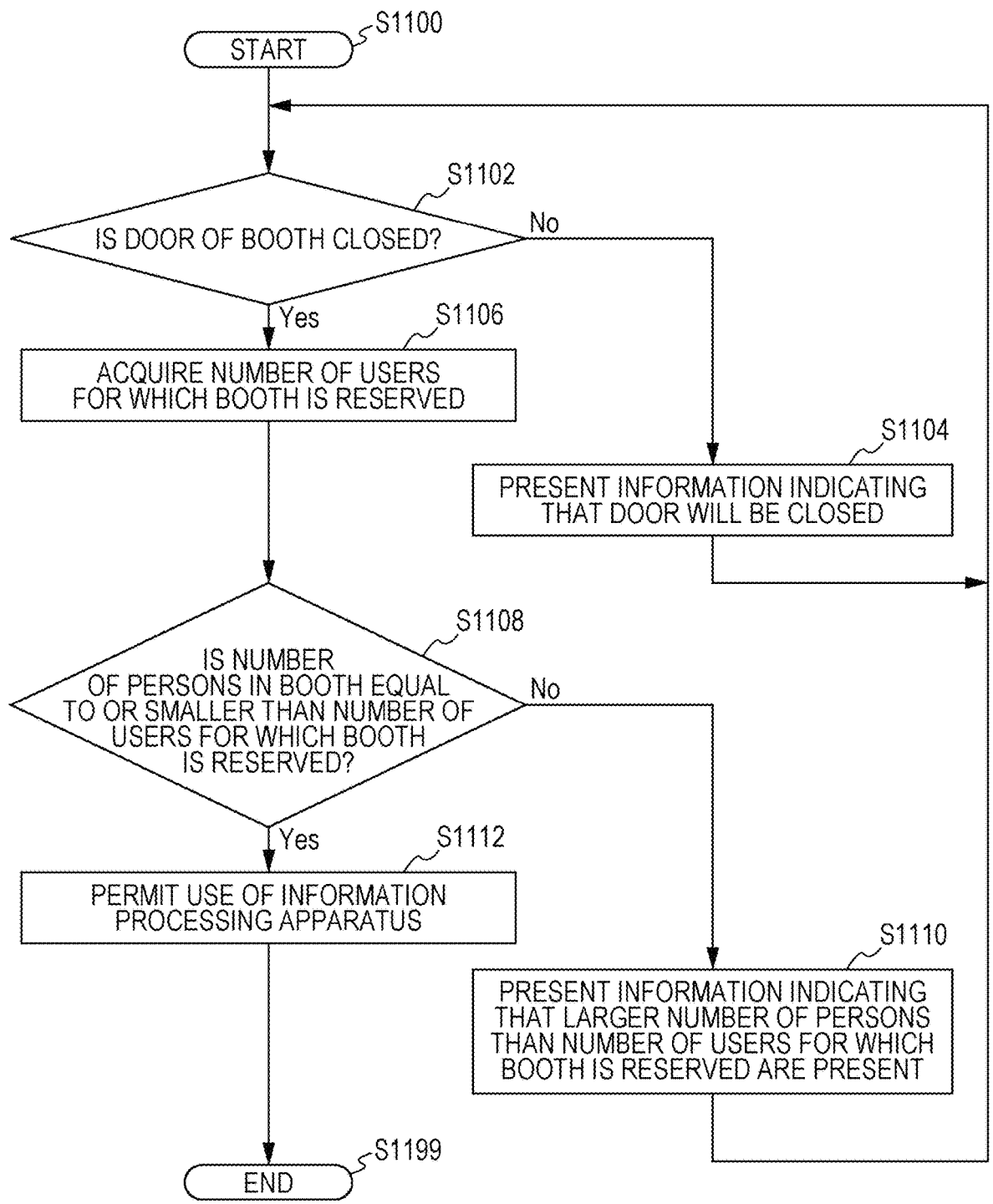
FIG. 11 is a flowchart illustrating an example of processing according to the present exemplary embodiment.

FIG. 11 is a flowchart illustrating an example of processing according to the present exemplary embodiment.

In Step S1102, the control module 140 determines whether or not the door 310 of the booth 300 is closed (or whether or not the door 310 of the booth 300 is locked). In a case where the door 310 of the booth 300 is closed, Step S1106 is performed. Step S1104 is performed in other cases.

In Step S1104, the warning module 145 presents information indicating that the door 310 will be closed, and Step S1102 is performed again.

In Step S1106, the control module 140 acquires the number of users for which the booth 300 is reserved.

In Step S1108, the control module 140 determines whether or not the number of persons in the booth 300 is equal to or smaller than the number of users for which the booth 300 is reserved. In a case where the number of persons in the booth 300 is equal to or smaller than the number of users for which the booth 300 is reserved, Step S1112 is performed. Step S1110 is performed in other cases. In a case where the number of persons that can use the booth 300 is a predetermined number (e.g., 1 person), the number of persons in the booth 300 need just be compared with this number.

In Step S1110, the warning module 145 presents information indicating that a larger number of persons than the number of users for which the booth 300 is reserved are present, and Step S1102 is performed again.

In Step S1112, the control module 140 performs control so that use of the information processing apparatus 100 (the virtual reality display device 200) is permitted. For example, the virtual reality display device 200 may be turned on, a lid of a box in which the virtual reality display device 200 is stored may be unlocked, the virtual reality display device 200 may be brought into a communicable state (e.g., communicable, for example, with a content server connected to the Internet), or content may be made downloadable. It is also possible to employ an arrangement in which opening and closing of a cable entry point is controllable, and in a case where the user 290 brings the virtual reality display device 200 into the booth 300, the cable entry point for the virtual reality display device 200 is opened. Information indicating that the virtual reality display device 200 is usable may be presented on a display of a booth managing presenting module 1260.

In a case where the virtual reality display device 200 is already installed in the booth 300 (in a case where the virtual reality display device 200 is a shared device), a notification prompting the user 290 to bring the virtual reality display device 200 back into a storage place (e.g., into a box) may be given to the user 290 when a managed time is reached. The display of the virtual reality display device 200 may be forcibly cleared. The expression "cleared" encompasses, for example, a case where an image (screen) is blackened, a case where only the display is cleared although the virtual reality display device 200 is on, a case where the virtual reality display device 200 or the display is brought into a sleep mode, and a case where the virtual reality display device 200 (or the display of the virtual reality display device 200) is turned off.

Figure 12:
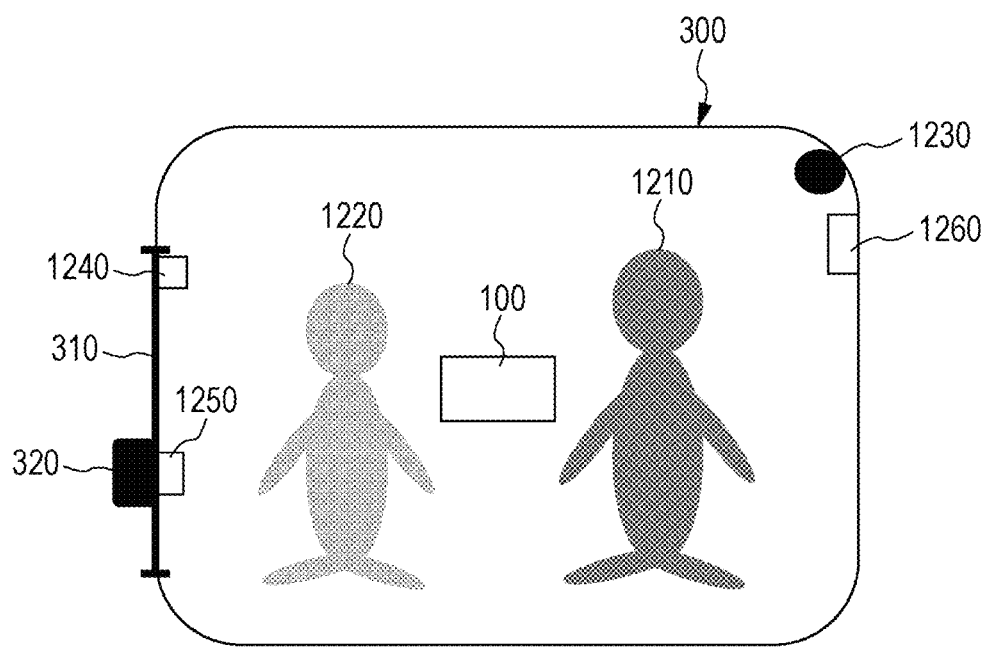
FIG. 12 is an explanatory view illustrating an example of processing according to the present exemplary embodiment.

FIG. 12 is an explanatory view illustrating an example of processing (an example of processing based on the flowchart of FIG. 11) according to the present exemplary embodiment. FIG. 12 illustrates an example in which the information processing apparatus 100 that is a VR apparatus is made unusable in a case where a larger number of persons than the number of persons for which the booth 300 is reserved are detected, a case where the door 310 is not locked, or in a case where the door 310 is opened.

In the booth 300, a user 1210 and a person 1220 are present. The information processing apparatus 100, a human detection sensor 1230, and the booth managing presenting module 1260 are provided in the booth 300, the door 310 is provided with a door opening closing sensor 1240, and the door knob 320 is provided with a lock sensor 1250.

The determining process in Step S1102 need just be performed by using a result of detection using the door opening closing sensor 1240 or the lock sensor 1250.

The human detection sensor 1230 detects the number of users in the booth 300.

The booth managing presenting module 1260, for example, manages the booth 300 and presents a message. That is, since the information processing apparatus 100 (the virtual reality display device 200) is in an unusable state at this moment, the booth managing presenting module 1260 (the booth managing presenting module 1260 has functions of the schedule management module 125, the control module 140, the image presenting module 115, and the like) gives a notification, a warning, and the like to a user. The booth managing presenting module 1260 determines whether or not the number of persons in the booth 300 is equal to or smaller than the number of persons for which the booth 300 is reserved and controls the information processing apparatus 100 (the virtual reality display device 200) to become unusable or issues a warning. For example, in a case where the booth 300 is reserved for a single user, the booth managing presenting module 1260 warns that there is a possibility that the person other than the user 1210 is present in the booth 300 in the example of FIG. 12.

In order to use the functions of the present exemplary embodiment, the functions of the present exemplary embodiment may be made executable or an inquiry as to whether or not the functions of the present exemplary embodiment are used may be presented on a user's terminal by using information obtained by near field wireless connection in a case of an electronic lock (for example, in a case where the door is unlocked through authentication using NFC, BLE, a beacon, or the like by using a terminal such as a smartphone) when the user enters the booth 300.

Specifically, a device (e.g., the booth managing presenting module 1260) in the booth 300 may communicate with a terminal of a user outside the booth 300, and in a case where the user is a user who has made a reservation, the electronic lock of the booth 300 may be unlocked. Furthermore, information for seeking confirmation about use of the booth 300 may be transmitted to the user's terminal and displayed on the user's terminal, and in a case where use of the booth 300 is confirmed, the electronic lock of the booth 300 may be unlocked.

Figure 13:
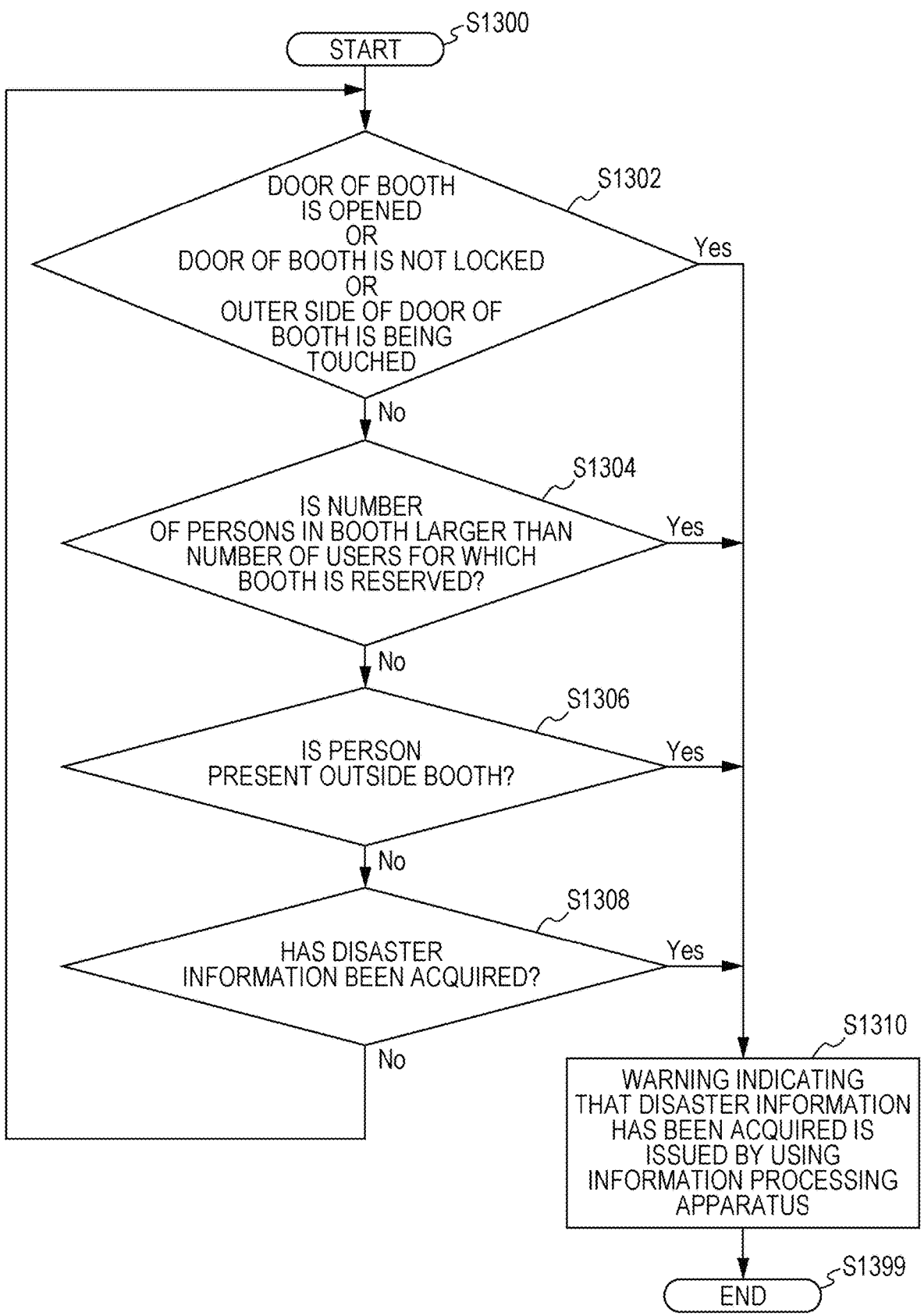
FIG. 13 is a flowchart illustrating an example of processing according to the present exemplary embodiment.

FIG. 13 is a flowchart illustrating an example of processing according to the present exemplary embodiment.

In Step S1302, the state of the door 310 of the booth 300 is determined. In a case where the door 310 of the booth 300 is opened, a case where the door 310 of the booth 300 is not locked, or in a case where an outer side of the door 310 of the booth 300 is being touched, Step S1310 is performed. Step S1304 is performed in other cases.

Figure 14:
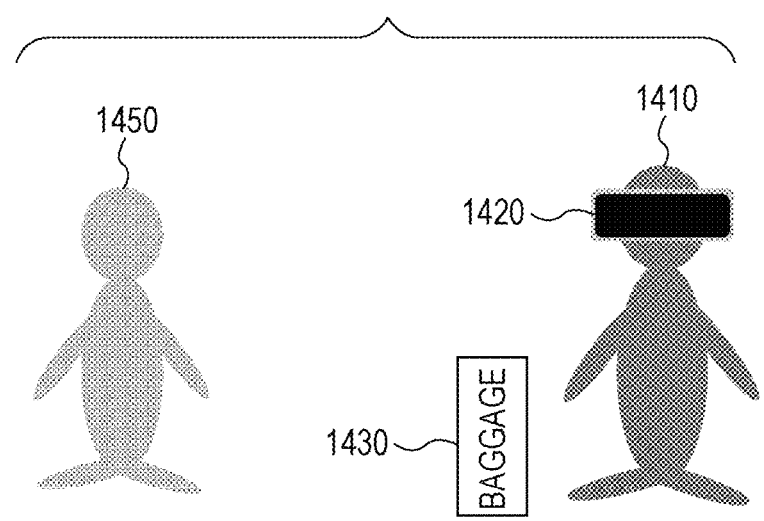
FIG. 14 is an explanatory view illustrating an example in which the present exemplary embodiment is not used.

FIG. 14 is an explanatory view illustrating an example of a case where the present exemplary embodiment is not used. A user 1410 wears a head-mounted display 1420 while leaving baggage 1430 on a floor. The user 1410 is enjoying a VR image by using the head-mounted display 1420. In this state, vision of the user 1410 is covered with the head-mounted display 1420, and therefore the user 1410 cannot grasp an outside situation. Therefore, another person 1450 close to the user 1410 can easily steal the baggage 1430 (or is given an opportunity to steal the baggage 1430).

This is the same as a state where the door 310 is opened or is not locked even in a case where the user 1410 is present in the booth 300.

In Step S1304, it is determined whether or not the number of persons in the booth 300 is larger than the number of users for which the booth 300 is reserved. In a case where the number of persons in the booth 300 is larger than the number of users for which the booth 300 is reserved, Step S1310 is performed. Step S1306 is performed in other cases. A process similar to the process in Step S1108 of the flowchart of FIG. 11 is performed.

In Step S1306, it is determined whether or not there is a person outside the booth 300. In a case where there is a person outside the booth 300, Step S1310 is performed. Step S1308 is performed in other cases. As described above, it may be determined that there is a person outside the booth 300 on a condition that the person is present within a predetermined distance from the booth 300 for a predetermined period or longer.

In Step S1308, it is determined whether or not disaster information has been acquired. In a case where disaster information has been acquired, Step S1310 is performed. Step S1302 is performed in other cases.

In Step S1310, a warning indicating that disaster information has been acquired is issued by using the information processing apparatus 100 (the virtual reality display device 200).

For example, in a case where it is determined Step S1302 that "the door 310 of the booth 300 is opened", a screen 1700a illustrated in FIG. 17A1 is presented on the display of the virtual reality display device 200. For example, a message "PLEASE CLOSE DOOR OF THIS BOOTH." is presented on the screen 1700a. Alternatively, a screen 1700a illustrated in FIG. 17A2 is presented on the display of the virtual reality display device 200. For example, a message "DOOR OF THIS BOOTH WAS OPENED. PLEASE CHECK DOOR." is presented on the screen 1700a.

Figure 17B:
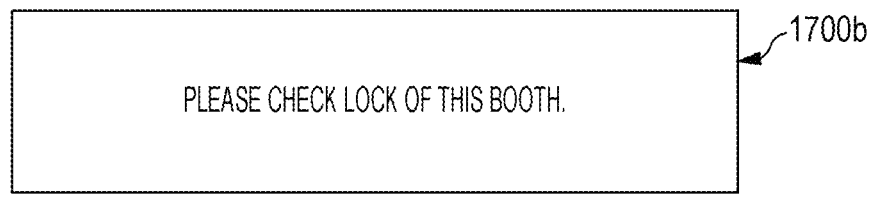

For example, in a case where it is determined in Step S1302 that "the door 310 of the booth 300 is not locked", a screen 1700b illustrated in FIG. 17B is presented on the display of the virtual reality display device 200. For example, a message "PLEASE CHECK LOCK OF THIS BOOTH." is presented on the screen 1700b.

Figure 17C:
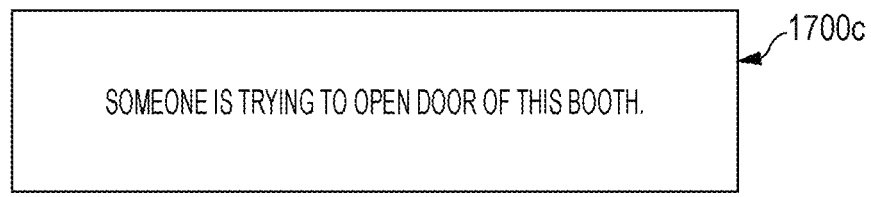

For example, in a case where it is determined Step S1302 that "the outer side of the door 310 of the booth 300 is being touched", a screen 1700b illustrated in FIG. 17C is presented on the display of the virtual reality display device 200. For example, a message "SOMEONE IS TRYING TO OPEN DOOR OF THIS BOOTH." is presented on the screen 1700c.

Figure 17D:
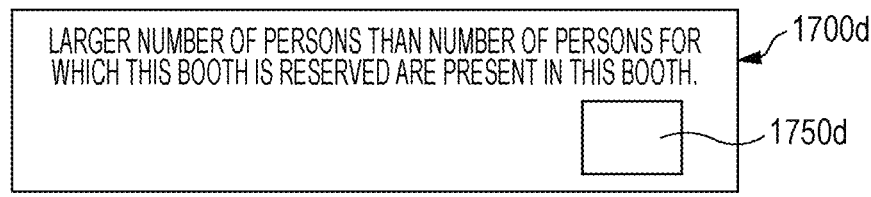

For example, in a case where it is determined in Step S1304 that "the number of persons in the booth 300 is larger than the number of users for which the booth 300 is reserved", a screen 1700d illustrated in FIG. 17D is presented on a display of the virtual reality display device 200. For example, a message "LARGER NUMBER OF PERSONS THAN NUMBER OF PERSONS FOR WHICH THIS BOOTH IS RESERVED ARE PRESENT IN THIS BOOTH." is presented on the screen 1700d, and a booth inner side image region 1750d is presented. In the booth inside image region 1750d, an image (examples of which include a moving image) taken by a camera 1640 is presented. This allows the user using the virtual reality display device 200 to check the inside of the booth 300 without removing the virtual reality display device 200.

Figure 17E:
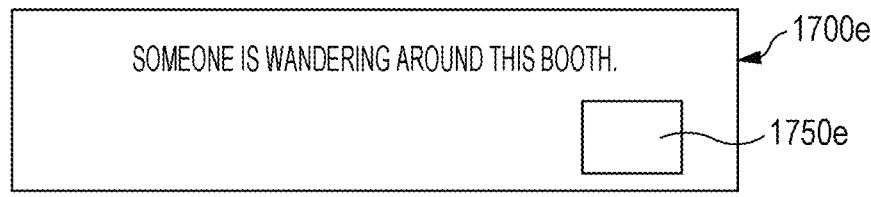

For example, in a case where it is determined in Step S1306 that "there is a person outside the booth 300", a screen 1700e illustrated in FIG. 17E is presented on the display of the virtual reality display device 200. For example, a message "SOMEONE IS WANDERING AROUND THIS BOOTH." is presented on the screen 1700e, and a booth outside image region 1750e is presented. In the booth outside image region 1750e, an image (examples of which include a moving image) taken by a camera 1540 is presented. This allows the user using the virtual reality display device 200 to check the person outside the booth 300 without removing the virtual reality display device 200 (without looking at an outside of the booth 300).

For example, in a case where it is determined in Step S1308 that "disaster information indicating occurrence of a fire has been received", a screen 1700f illustrated in FIG. 17F is presented on the display of the virtual reality display device 200. For example, a message "FIRE HAS OCCURRED. PLEASE EVACUATE." is presented on the screen 1700f.

For example, in a case where it is determined in Step S1308 that "disaster information indicating occurrence of an earthquake has been received", a screen 1700f illustrated in FIG. 17F2 is presented on the display of the virtual reality display device 200. For example, a message "EARTHQUAKE HAS OCCURRED IN **. PLEASE PREPARE FOR BIG SHAKING." is displayed on the screen 1700f.

Figure 15:
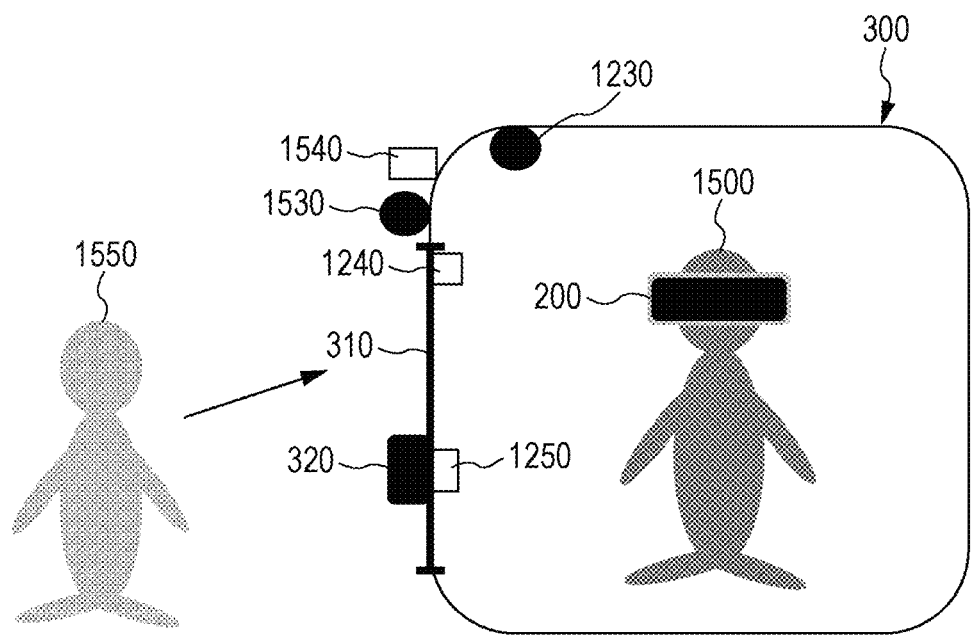
FIG. 15 is an explanatory view illustrating an example of processing according to the present exemplary embodiment.

FIG. 15 is an explanatory view illustrating an example of processing according to the present exemplary embodiment.

A user 1500 is present in the booth 300, and the user 1500 is wearing the virtual reality display device 200.

A human detection sensor 1230 is provided in the booth 300, a human detection sensor 1530 and a camera 1540 are provided outside the booth 300, a door opening closing sensor 1240 is provided on the door 310, and a lock sensor 1250 is provided on the door knob 320.

The determining process in Step S1302 need just be performed by using a result of detection using the door opening closing sensor 1240, the lock sensor 1250, the human detection sensor 1530, and the camera 1540.

The determining process in Step S1306 need just be performed by using a result of detection using the human detection sensor 1530 and the camera 1540.

Figure 16:
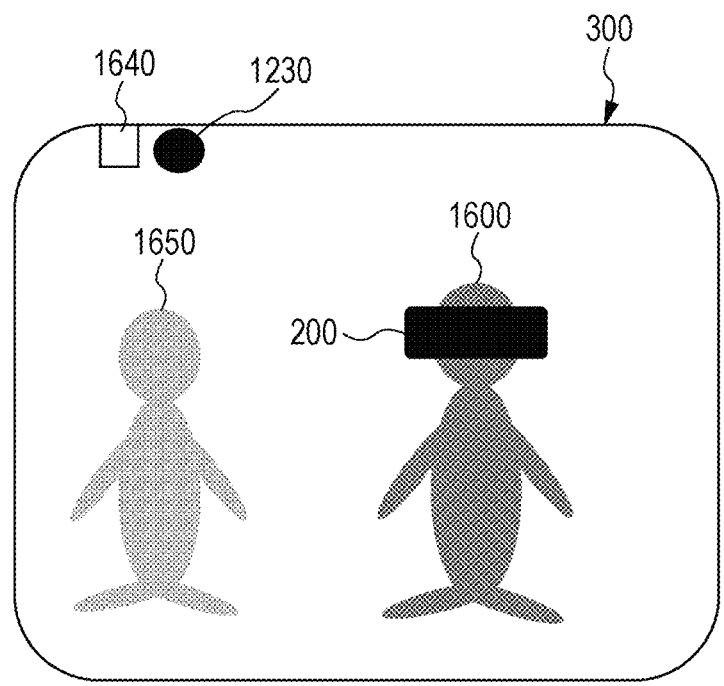
FIG. 16 is an explanatory view illustrating an example of processing according to the present exemplary embodiment.

FIG. 16 is an explanatory view illustrating an example of processing according to the present exemplary embodiment.

A user 1600 and another person 1650 are present in the booth 300, and the user 1600 is wearing the virtual reality display device 200.

In the booth 300, a human detection sensor 1230 and a camera 1640 are provided.

The determining process in Step S1304 need just be performed by using a result of detection using the human detection sensor 1230 and the camera 1640.

Figure 18:
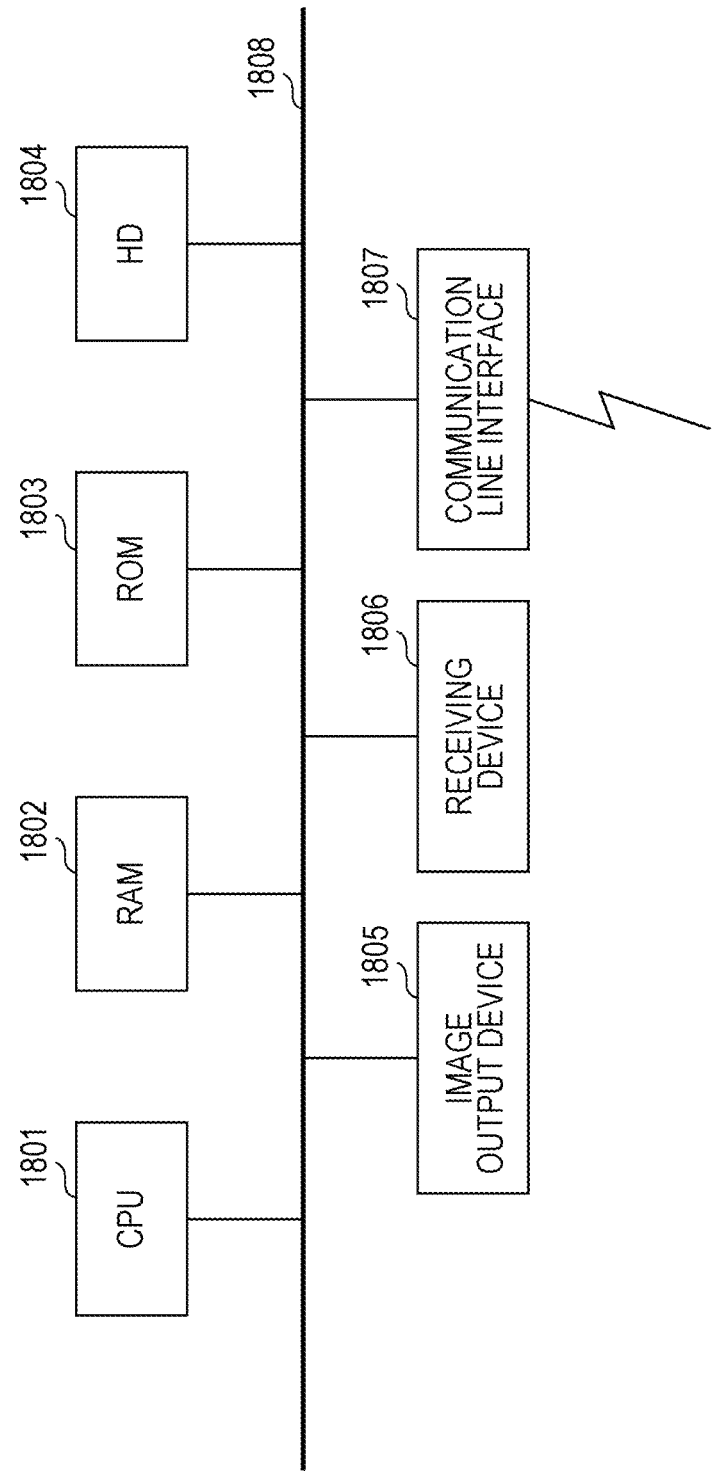
FIG. 18 is a block diagram illustrating an example of a hardware configuration of a computer that realizes the present exemplary embodiment.

A hardware configuration of a computer that executes a program according to the present exemplary embodiment is a general computer as illustrated in FIG. 18 and is specifically a computer incorporated into the virtual reality display device 200, a personal computer, a computer that can serve as a server, or the like. In a specific example, a CPU 1801 is used as a processing unit (a computing unit), and a RAM 1802, a ROM 1803, and a HD 1804 are used as storage devices. For example, a hard disk or a solid state drive (SSD) may be used as the HD 1804. The computer is constituted by the CPU 1801 that executes programs such as the motion detection module 105, the image presenting module 115, the schedule receiving module 120, the schedule management module 125, the notification module 130, the sensor result receiving module 135, the control module 140, and the warning module 145, the RAM 1802 in which the programs and data are stored, the ROM 1803 in which a program for activating the computer and the like are stored, the HD 1804 that is an auxiliary storage device (e.g., a flash memory) having a function of the image storage module 110, a receiving device 1806 that receives data on the basis of a user's operation (examples of which include an action, voice, a gaze, and the like) on a keyboard, a mouse, a touch screen, a microphone, and a camera (examples of which include a gaze detection camera), an image output device 1805 such as a CRT, a liquid crystal display, or a speaker, a communication line interface 1807 for connection with a communication network such as a network interface card, and a bus 1808 for connecting these members so that data can be exchanged. Plural computers configured as above may be connected over a network.

As for a computer program according to the exemplary embodiment, the exemplary embodiment is realized by cooperation of software and a hardware resource by loading the computer program that is software into a system having the above hardware configuration.

The hardware configuration illustrated in FIG. 18 is merely an example, and the present exemplary embodiment is not limited to the configuration illustrated in FIG. 18, provided that the modules described in the present exemplary embodiment are executable. For example, one or more of the modules may be realized by dedicated hardware (e.g., an application specific integrated circuit (ASIC)), one or more of the modules may be provided in an outside system and connected through a communication line, or plural systems illustrated in FIG. 18 may be connected through a communication line and operate in cooperation with one another. The computer may be incorporated into not only the virtual reality display device 200, but also a mobile information communication apparatus (examples of which include a mobile phone, a smartphone, a mobile device, and a wearable computer) or the like.

The program described above may be stored in a recording medium or may be offered through means of communication. In this case, the program described above may be grasped as an invention of a "computer-readable recording medium storing a program".

The "computer-readable recording medium storing a program" refers to a computer-readable recording medium storing a program that is used for installation, execution, distribution, and the like of the program.

Examples of the recording medium include digital versatile discs (DVDs) such as "DVD-R, DVD-RW, and DVD-RAM" that are standards set in a DVD forum and "DVD+R and DVD+RW" that are standards set in DVD+RW, compact discs (CDs) such as a read-only memory (CD-ROM), a CD recordable (CD-R), and a CD rewritable (CD-RW), a Blu-ray (registered trademark) disc, a magnetooptic disc (MO), a flexible disc (FD), a magnetic tape, a hard disk, a read-only memory (ROM), an electrically erasable programmable read-only memory (EEPROM (registered trademark)), a flash memory, a random access memory (RAM), and a secure digital (SD) memory card.

The whole or part of the program may be, for example, stored or distributed by being recorded on the recording medium. The program may be transferred by using a transfer medium such as a wired network or a wireless communication network used for a local area network (LAN), a metropolitan area network (MAN), a wide area network (WAN), the Internet, an intranet, an extranet, or the like, or a combination thereof or may be carried on a carrier wave.

Furthermore, the program described above may be part or all of another program or may be recorded on a recording medium together with a different program. Alternatively, the program described above may be recorded in plural recording media in a distributed manner. Alternatively, the program described above may be recorded in any form (e.g., in a compressed form or an encrypted form) as long as the program can be restored.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 a processor, configured to:
  perform control so that a device that covers a user's vision becomes available in a closed space that accommodates at least one user, in a condition that a door of the closed space is closed or locked;
  acquire a number of users for which the closed space is reserved;
  determine whether a number of persons in the closed space is equal to or less than the number of users for which the closed space is reserved;
  in response to the number of persons in the closed space being determined to be equal to or less than the number of users for which the closed space is reserved, permit the device to be used; and
  in response to the number of persons in the closed space being determined to be greater than the number of users for which the closed space is reserved, not permit the device to be used and present information, on the device, indicating that the number of persons in the closed space is greater than the number of users for which the closed space is reserved.

2. The information apparatus according to claim 1, wherein the processor is further configured to:
 perform control so that the device becomes unavailable in the closed space, in a condition that the door of the closed space is open or unlocked.

3. The information processing apparatus according to claim 1, wherein in the condition that the door of the closed space is closed or locked, the processor is further configured to:
 receive a state of the door detected by a sensor provided inside or outside of the closed space.

4. The information processing apparatus according to claim 1, wherein in the condition that the door of the closed space is closed or locked, the processor is further configured to:
 receive the number of persons in the closed space detected by a sensor provided inside or outside of the closed space.

5. The information processing apparatus according to claim 1, wherein the processor is further configured to:
 determine whether each of the persons in the closed space is one of the users reserving the closed space through face recognition.

6. The information processing apparatus according to claim 1, wherein the processor turns on the device when the device is permitted to be used.

7. The information processing apparatus according to claim 1, wherein the processor unlocks a box in which the device is stored when the device is permitted to be used.

8. The information processing apparatus according to claim 1, wherein the processor allows the device to be connected to a server or allows the device to download contents from the server when the device is permitted to be used.

9. A non-transitory computer readable medium storing a program causing a computer to:
 perform control so that a device that covers a user's vision becomes available in a closed space that accommodates at least one user, in a condition that a door of the closed space is closed or locked;

acquire a number of users for which the closed space is reserved;
determine whether a number of persons in the closed space is equal to or less than the number of users for which the closed space is reserved;
in response to the number of persons in the closed space being determined to be equal to or less than the number of users for which the closed space is reserved, permit the device to be used; and
in response to the number of persons in the closed space being determined to be greater than the number of users for which the closed space is reserved, not permit the device to be used and present information, on the device, indicating that the number of persons in the closed space is greater than the number of users for which the closed space is reserved.

* * * * *